United States Patent [19]

Kelly

[11] 4,168,696

[45] Sep. 25, 1979

[54] FOUR QUADRANT, TWO DIMENSIONAL, LINEAR SOLAR CONCENTRATION PANELS

[76] Inventor: Donald A. Kelly, 58-06 69th Pl., Maspeth, N.Y. 11378

[21] Appl. No.: 728,137

[22] Filed: Sep. 30, 1976

[51] Int. Cl.² .................................................. F24J 3/02
[52] U.S. Cl. ...................................... 126/438; 60/641; 126/440
[58] Field of Search ............... 126/270, 271; 237/1 A; 60/641

[56] References Cited

U.S. PATENT DOCUMENTS

| 895,761 | 8/1908 | Huntoon | 126/271 |
|---|---|---|---|
| 1,683,266 | 9/1928 | Shipman | 126/271 |
| 1,704,173 | 3/1929 | Chesney | 126/271 |
| 3,868,823 | 3/1975 | Russell, Jr. et al. | 126/271 X |
| 3,976,508 | 8/1976 | Mlavsky | 126/271 X |
| 3,988,166 | 10/1976 | Beam | 126/271 X |

*Primary Examiner*—Samuel Scott
*Assistant Examiner*—Larry Jones

[57] ABSTRACT

The four quadrant, deep concave, linear solar concentration panel has been evolved to meet the need for a practical, low-cost solar energy conversion system, for individual house power supplementation installations.

This specific type of solar concentration panel is not designed for a solar photovoltaic conversion arrangement, but for a water steam and flash boiler pipe arrangement where the generated steam is used to drive a rotary steam engine and 110 VAC alternator with a minimum rating of 10 KW/hr.

The advocated solar concentration panel has a panel width to flash boiler pipe diameter of about 18:1, which provides a solar concentration ratio of between 22:1 and 27:1, at this point in time.

The concentration panel width to height cross-section ratio is approximately 2.5:1, and the base focal line distance to panel height ratio is 1:2.5.

10 Claims, 6 Drawing Figures

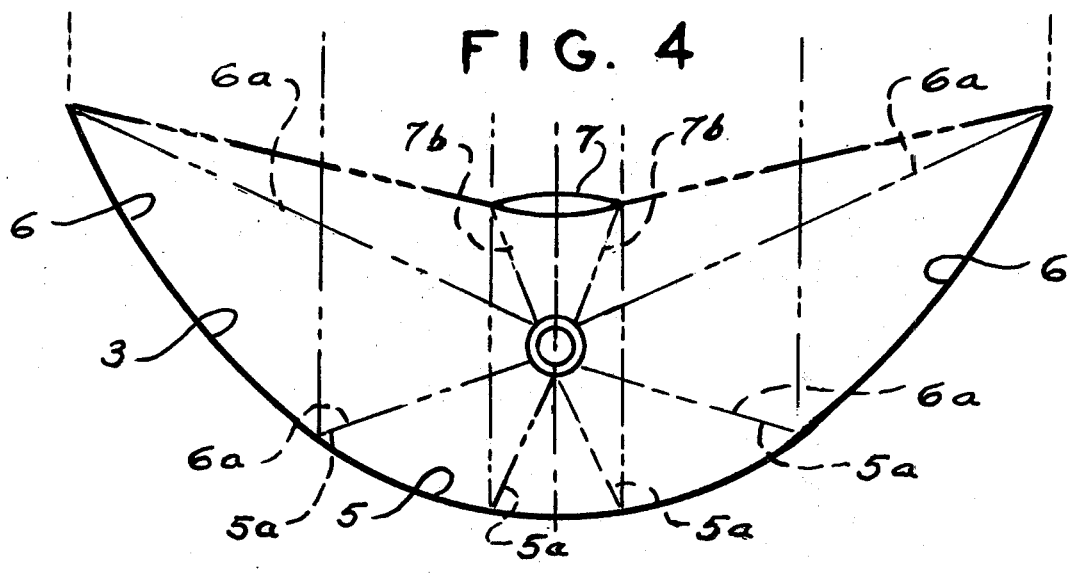
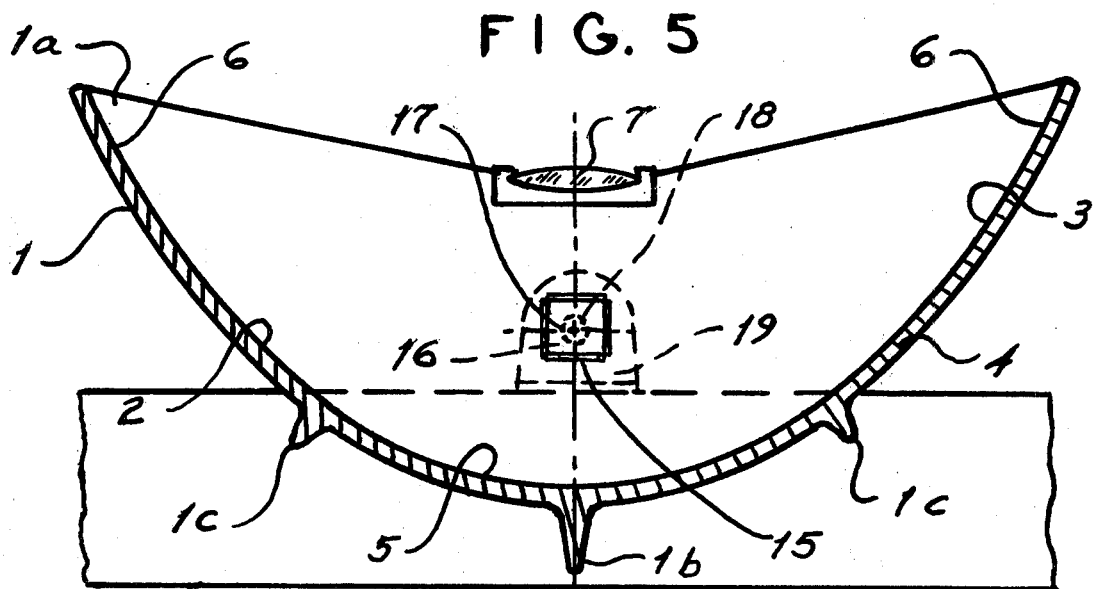
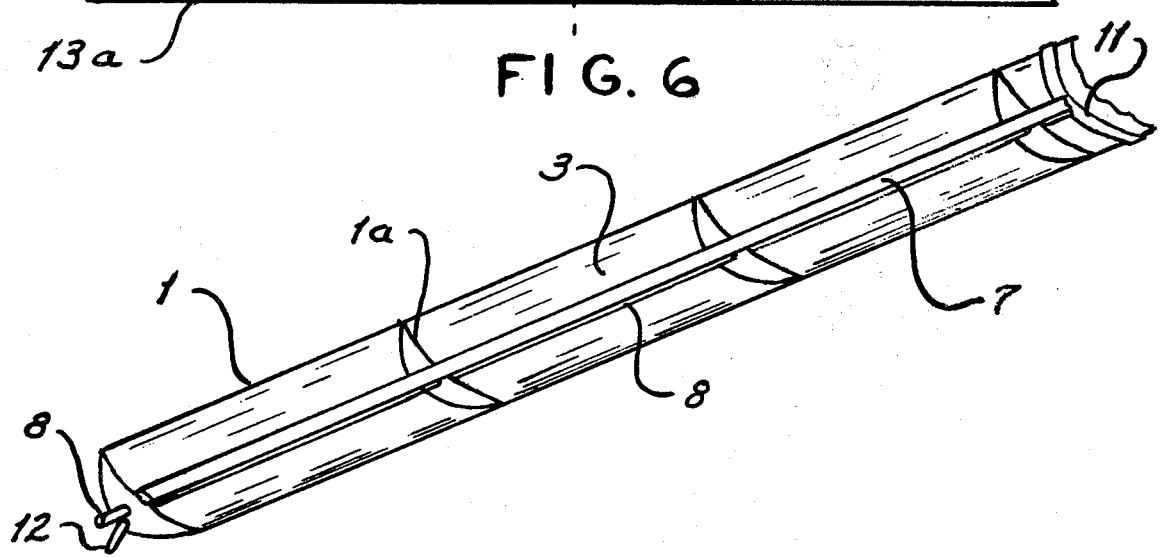

FOUR QUADRANT, TWO DIMENSIONAL, LINEAR SOLAR CONCENTRATION PANELS

BACKGROUND OF THE INVENTION

There is a real need for a practical, low-cost solar energy conversion system which has simple long-lived mechanical components, and functions with a minimum of breakdowns and replacement of individual parts.

Because the state of the art in silicon photovoltaic solar cells is far away from the cost competitive marketing stage, it appears that an alternate, low-cost mechanical solar thermodynamic conversion method is worthy of development, and eventual market acceptance.

In addition to their inordinate high cost, even in sizable quantities, silicon solar cells are fragile and are subject to breakage during violent storms and their full life expectancy has yet to be established in wide scale field installations. When the cost of these solar cells is eventually lowered to a wide scale commercial acceptance level, the above design problems will probably still exist to some degree.

In view of the various shortcomings of the solar photovoltaic conversion method, a simpler thermodynamic conversion arrangement which has already been tried and established, appears to be more promising, since it offers lower cost, and better over-all ruggedness and reliability.

The key component for any type of solar thermodynamic conversion system will be the reflective concentrator unit, either the dish or linear parabolic concentrator, since large diameter lenses are economically impractical. Most of the attention in the experimental development of solar concentration has gone to the dish or circular type of parabolic reflector.

The attraction of the dish parabolic reflector is difficult to rationalize from an objective design standpoint, since it offers a generally poor concentration area "spot", to dish exposure area ratio, and a very high spot temperature will usually pose more of a design problem than the value of the end application.

The current academic effort to match the disc parabolic reflector with a high output, water-cooled silicon solar cell must be viewed with some misgivings, and as a design mismatch when all the various design factors are thoroughly considered.

The very high temperature spot of the dish parabolic reflector would be better applied to the hot side of a moderately rated Stirling cycle engine, which would drive an alternator for electrical output, that on a silicon solar cell of far lower corresponding wattage output. Although the comparitive cost of both arrangements would favor the photovoltaic means, it is probable that the cost per watt of the solar mechanical to electrical conversion method would cost about one third of an equivalent 10 KW/hr photovoltaic system installation.

A very attractive middle ground between one sun (no concentration), and very high 500 sun (500:1 concentration ratio), would be adoption of linaer parabolic reflectors, with concentration ratios between about 20:1 and 50:1. The linear parabolic reflectors would be compatibly practical for both photovoltaic conversion and thermodynamic mechanical to electrical solar conversion methods.

Another useful design feature of the linear parabolic reflector (L.P.R.), is that they offer a good concentration "strip", area to panel exposure area ratio, which makes this type of concentrator a natural match with the flash boiler pipes of the hot water steam engine alternator system. The narrow long solar concentration strip will naturally coincide with the relatively long flash boiler pipe, to flash the hot water over to steam within a reasonal total lenght of joined pipe lengths.

The L.P.R.'s will also be practical for solar photovoltaic conversion systems because of the improved concentration strip area to panel exposure area ratio previously mentioned, and the fact that the lower concentration temperatures allow the use of lower cost photovoltaic solar cells..

Of the two possible solar conversion means covered, the matching of the L.P.R.'s with the flash boiler pipes is projected as the most promising method, based on the factors of first and operating costs, reliability, ruggedness, and maintainability.

Another immediate point in favor of the mechanical to electrical conversion means is that all of the cost factors can be accurately predetermined, unlike the solar photovoltaic cells, where the present high costs are prohibitive for most installations, with the future cost picture uncertain and showing little sign of imminent cost reduction.

The cost of fabricating the linear parabolic reflectors will be substantially less than for a corresponding circular dish parabolic reflector, because simple linear forms can be used to produce the L.P.R.'s compared with the more complex steps required for the dish paraboloids.

The presently advocated quadrant four deep concave, linear solar concentrator panel differs from the earlier classic linear parabolic reflectors in that the earlier L.P.R.'s provided solar concentration in the two lower quadrants and only in one dimension, the width at the focal line. The earlier type of L.P.R. used to heat water into steam through a focal line pipe was shallow with a limited concentration ratio of about 5:1.

This latest type of L.P.R. provides solar concentration in all four quadrants at the focal zone, or all around solar heating in two dimensions.

The additional concentration quadrants are provided by the inclusion of uniformly concave reflector extension sections onto the lower base parabolic reflector cross-section. These reflective extensions are smoothly blended into the base parabolic section, and both add about one quadrant of solar concentration at the flash boiler pipe.

The fourth and completing concentration quadrant is provided by top linear convex lens sections, which concentrate solar rays directly onto the top of the flash boiler pipe(s).

The solar rays that fall normal to the solar panel surface are concentrated in two dimensions, width and height, and since the panel is symmetrical about the vertical centerline, all around solar concentration is achieved when the top linear lens is also utilized. When the flash boiler pipe is placed at the normal focal line of the base parabolic reflector section, the solar rays are concentrated on the bottom width from the lower parabolic section, and the height, on both sides from the two side concave extension sections.

Although it is a logical design point to utilize a large size width of full parabolic reflector cross-section, for large solar concentration ratios coupled with a small size of steam boiler pipe. There are three reasons for not following this approach.

The first, and most important point is that the focal line of a para bola in linear form, is always in line with the two lateral end lines, by geometric definition, so that desirable solar concentration above the focal line is not possible. The second reason is that the basic parabolic shape will not have the best possible structural section modulus, when used for an elongate solar panel.

The final reason against the full parabola is that the solar rays must now focus on an elongate vertical surface, rather than a a (point) line, since the solar rays are concentrated on the flash boiler pipe which has height, in this geometric concentrator application.

A major design consideration in the application of any type of solar concentrator panel is that the vertical axis centerline must always be kept in line with the normal solar rays at any given time. The solar rays must fall normal to the horizontal axis of panels, so that symmetrical or uniform solar ray distribution is achieved. The failure of a solar concentrator panel to remain vertically lined up with the solar rays within about three degrees will result in an inordinate dropoff in the temperature of the flash boiler pipe, for any given solar intensity.

Essentially, this new type of four quadrant, deep concave, linear solar concentration panel requires the adoption of a new composite geometric cross-section, in order to achieve the desired ends of a practical, low-cost solar concentration method, for several solar conversion applications.

SUMMARY OF THE INVENTION

The four quadrant, deep concave, linear solar concentration panel meets the necessity for an effective low-cost means for concentrating solar rays for several solar energy conversion applications.

This new type of solar concentrator is a blended composite of two basic geometric shapes, joined to provide solar ray concentration in all four quadrants of a focal hot water-steam pipe, or solar cell array in a boxlike form, or all around solar concentration in two dimensions, width and height.

Although no solar concentration occurs over a unit length of the flash boiler pipe, this fact is of no practical consequence, since the total concentration ratio (minimum of 22:1), falls on each unit length of the boiler pipe. It must be noted here that the dish parabolic reflector also provides concentration only in two dimensions, width and length, and not height, as in this present case.

The base parabolic cross-section of the solar panel is blended with two equal and opposite concave reflective sections which end at the upper limit, when the panel cross-section width-to-height ratio is between 2.4;1 and 2.5:1.

The concentration panel has a width to flash boiler pipe diameter ratio of about 18:1, which provides a solar concentration ration of between 22:1 and 27:1, (or 22 suns to 27 suns).

The base focal line distance from the bottom of the panel to the full panel height ratio is 1:2.5.

The foregoing proportions for the solar concentration panel define the cross-sectional features and limits of the section configuration. The minimum proportions will provide three quadrant concentration in two dimensions, while the maximum proportions will allow a slight solar ray overlap at the coincident lines.

The coincident lines are the limit lines along the length of the flash boiler pipe where the concentrated solar rays from all the geometric sections, and top linear lens, converge and meet on the flash boiler pipe.

The various solar concentrator proportions were evolved to provide an optimum concentration ratio at the focal surfaces, while keeping the panel within practical width limits and structurally rigid. The solar concentrator panel must not be made excessively wide, (wider than about 18"), because of the problem of keeping the panels normal and stable, unaffected by high winds and storms.

It is of further importance that the panels be as light in weight as is practical for ease of installation and replacement, and to make the sun following drive arrangement easy to operate with a small size electric motor. This lightweight requirement makes the use of fiberglass epoxy construction the first choice since this material is tough, can be readily formed over accurate molds, and has excellent resistance to weather deterioration.

Since the solar panels must be thin to keep the weight down, the use of uniformly spaced partitions, longitudinal ribs and stringers becomes necessary to maintain overall panel rigidity and strength. Torsional stiffness is also necessary for the panels to maintain the normal line-up with the solar rays within the angular tolerance during sun following oscillation of all of the panels. The careful placement of the partitions, ribs and stringers will meet these strength requirements for the panel.

The inclusion of the top linear lens to the composite panel section will require a careful balancing proportioning of solar ray concentration between the sections, since the top linear lens will block out some solar rays to the lower base parabolic reflector section. The balancing and distribution of the converging solar rays must be made in the two side concave extension sections, and in the selection of the width and focal length of the top linear lens.

The balancing of the converging solar rays is important for the uniform heating of the flash boiler pipe, so that the expansion and internal stresses within the pipe sections are uniform for a normal pipe life expectancy. The flash boiler pipe temperature should never exceed 300 degrees F., with 250 degrees F, being closer to an ideal operating temperature to flash the internal hot water flow over to steam within a practical total pipe length of about sixty feet, for a $\frac{3}{4}''$ diameter pipe size.

The intake water temperature from several rooftop water heating units will be about 130 degrees F., and this hot water flow may enter several flash boiler pipe runs in order to supply the final steam flow rate for the rotary steam engine.

For the best heat transfer effectiveness, brass pipe should be used for the flash boiler pipes, with a black oxide outer coating applied to draw in the concentrated solar heat from the converging solar rays.

It is obvious that another way to increase the solar concentration ratio and heating level on the flash boiler pipe is to reduce the pipe diameter, which can reduce the total length of the boiler pipes required. It can be seen that the flash boiler piping arrangement can be made flexible, with several minimum $\frac{1}{2}''$ diameter pipes used with maximum ratio concentrators, or maximum 1" diameter pipes used with maximum ratio concentrators, with fewer pipe runs required for an equivalent rating steam flow system. It is now believed that the most effective solar concentration installation will consist of the minimum diameter flash boiler pipe size combined with maximum ratio solar concentrators.

Although more piping runs may be required for a given steam flow rate, all of these piping runs will be considerably shorter, so that a smaller total exposed surface area will be necessary for the full solar conversion installation.

While the L.P.R. panels may be up to thirty feet or longer, for some installations, the individual panel sections may be fabricated in about five foot lengths for manufacturing convenience, which are then joined with formed metal slip on connectors to produce the final panel lengths for each specific power system installation.

The L.P.R. panels are molded of several layers of fiberglass and epoxy resin on accurate, uniformly linear concentrator forms, with high reflective mirror surfaces bonded to the inside continous concave cavity. Small, identical mirror segments may be used in place of the continous mirror surface, but these must be made quite narrow to provide the uniformly converging solar ray pattern necessary for proper concentration. During the early stages of concentrator development it was found that the use of the thin, reflective aluminum foil was not satisfactory as a reflective surface since tiny wrinkles, lines and various surface imperfections spoiled the smooth continuous reflective surface requirement.

Each specific house type, style and roof surface area will dictate the placement of the various system components, which may be split up into different rooftop or other raised structures, zones, if necessary to provide the total exposed surface area required. It is presently projected that the solar conversion system using these new concentrator panels will require approximately 1,000 square feet of surface area fully exposed to the sun with additional surface area required for the multiple water heating units. It is possible that less exposed surface area will be required as the concentrator panels are improved in the future, but such improvements may increase the costs at an inordinate cost effective rate.

The assembled solar panels are mounted directly onto the flash boiler pipes by means of formed pivot wires, so that each panel may oscillate to follow the sun during each day.

The flash boiler piping may be pre-assembled on lightweight framework to save installation time, with coupled connections made to the intake hot water line, and outlet steam line to the engine. All of the flash boiler pipes will be connected to a hot water header at one panel pivoting end, and to a steam header at the opposite panel pivoting end, so that any number of piping runs, or back and forth piping loops may be conveniently collected for subsequent coupling to the water supply and steam sides of the system.

The assembled solar panels should have a slight southerly slope for optimum solar exposure, but the slope must not be too great, since this could impose an excessive water pumping load on the system circulating pumps.

The pivoting axis of the solar panels must generally be in line with the north-south direction so that all of the solar panels oscillate east-to-west during the day, and then return to the next day's reset position during the night.

The sun-following linkage mechanism necessary to keep the panels tracking on the sun will not be described in these specifications because they have been detailed in previous development work disclosures. This present specification covers only the details of the four-quadrant, two dimensional panel configuration.

While the photovoltaic solar cell conversion method is not the first choice for matching with this type of four-quadrant, two-dimensional solar panel, the photoelectric cells may, none the less be planned for, as cost reduction progress is made in this technological area.

For these new solar panels, the solar cells would be arranged in a box cross-section form so that full advantage is taken of the four quadrant, two dimension solar concentration. There may be considerable advantage in arranging the solar cells in a continuous box cross-section form, because the lower concentration levels at each quadrant reflective section may allow the use of lower cost silicon solar cells, compared to the dish parabolic reflector system.

A central, thin-wall water tubing line may run through the cennter portion within the box-form array of solar cells for cooling the solar cells, and for water warming purposes for house use. Because the solar cells will be at least one inch (1″) high and wide, a one inch diameter tubing length would be required to maintain at least tangent line contact with each solar cell.

Variations may be made in the number, type and positioning of the solar cells of the basic box-form cross-section, so that the best possible wattage to cost ratio is achieved for the lowest total exposure area for the panels. The less expensive bi-metal thermocells may be utilized for the box-form exposure, if a worthwhile wattage output is produced for a given total exposure area.

It is a principal object of the invention to create a solar energy conversion system which produces steam-to-electric, two step conversion, for approximately one-half to full housepower requirements within a competitive cost per watt per hour power system.

It is a further object of the invention to provide a competitive all electric, all photovoltaic conversion system to provide an all year round operation, without concern for freezing outside air temperatures.

Other objectives and means for the invention have been described in the previous specifications. It should be understood that changes and variations may be made in the detail design of the four quadrant, two dimension, linear solar concentrator panels, without departing from the spirit and scope of the invention as specified.

Several Disclosure Documents have been filed as prior informal descriptions of this of this type of solar concentrator panel.

Disclosure Documents: (1) Solar Power System No. 052189, High Density, Reflective Solar Panels No. 052196, High Concentration, Linear Solar Panels No. 052258.

DESCRIPTION OF THE DRAWINGS

FIG. 4 is a schematic cross-section of a four quadrant, two dimenension, linear solar concentration panel.

FIG. 5 is an alternate cross-section view of a four quadrant, two dimension, linear solar concentration panel.

FIG. 6 is a partial pictorial view of one four quadrant, two dimension, linear solar concentration panel, positioned on a flash boiler pipe section.

DESCRIPTION OF THE PREFERRED EMBODIMENT

Figure 1:
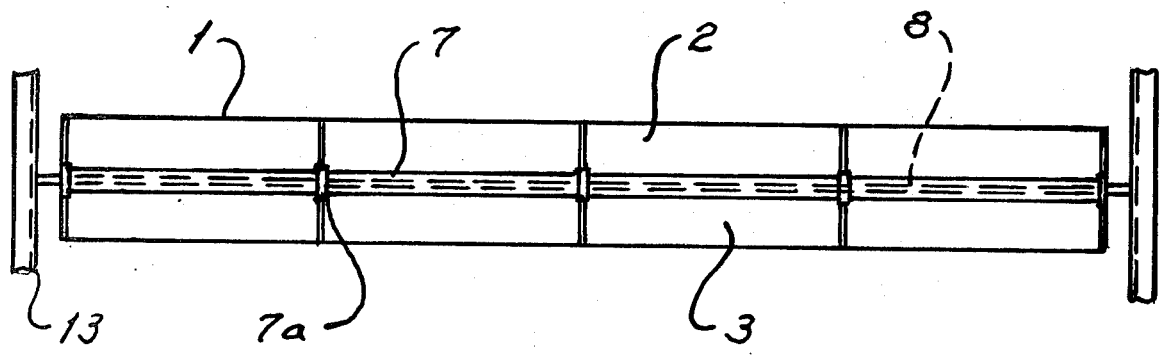
FIG. 1 is a plan view of one four quadrant, two dimension, linear solar concentration panel.
Figure 2:
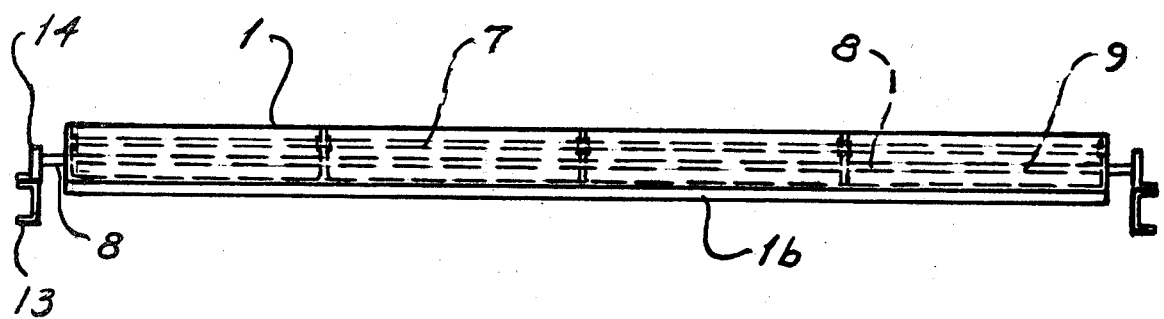
FIG. 2 is an elevation view of one four quadrant, two dimension, linear solar concentration panel.
Figure 3:
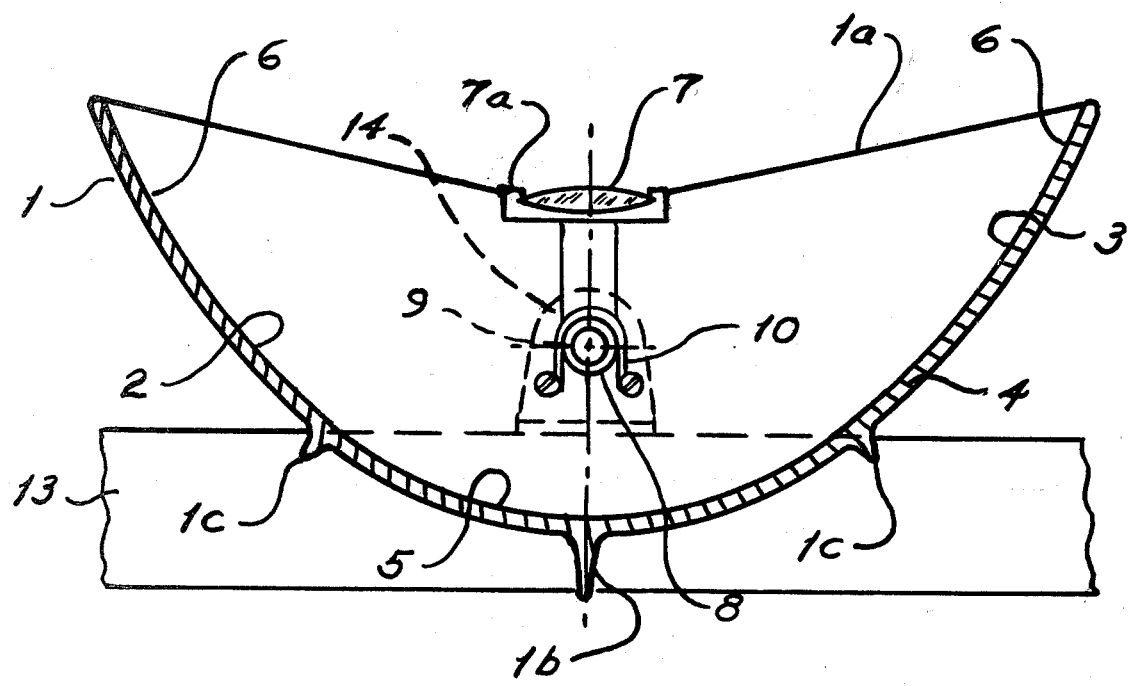
FIG. 3 is a cross-section view of a four quadrant, two dimension, linear solar concentration panel.

The four quadrant, two dimensional, linear solar concentrator panel is comprised of the linear solar concentrator panel 1, which must have a highly reflective or mirror surface 2, on the full inner concave surface 3.

The solar concentrator panel 1, is formed from several layers of fiberglass 4, and bonded with epoxy resin, to form a lightweight durable and rigid structural member, The panel 1, cross-section is a blended composite of a base parabolic reflector section 5, which is symmetrical about the vertical centerline of the panel, for producing the converging solar rays 5a. Two equal and opposite uniformly concave reflective sections 6, are blended into the upper ends of the base parabolic reflectior section 5, for providing the converging solar rays 6a.

The solar panel 1, structure includes multiple, uniformly spaced partitions 1a, a bottom exterior reinforcement rib 1b, and exterior side stringers 1c, which all contribute to the structural integrity of the solar panel 1.

Multiple top convex lens sections 7, are supported at the partitions 1a, with the lens bases 7a, and accurately located so that the uniformly converging solar rays 7b, fall over the width of the flash boiler pipe 8, located at the linear focal zone 9, of the solar panel 1.

The flash boiler pipe 8, supports the solar panel 1, with uniformly spaced formed wire loops 10, which are secured to each panel partition 1a, with standard hardware.

Each panel length section is joined together with a formed metal slip-on connector 11, so that any total length of linear solar concentration panel may be provided for each specific power installation.

A lower oscillating link 12, is secured to each end partition 1a, for connection to a recirpocating rod which is part of the sun tracking mechanism. (not included in this specification).

The flash boiler pipe(s) 8, may be preassembled and supported by a lightweight framework 13, and mounting brackets 14, to save installation time.

In the alternate, all electric solar photovoltaic conversion system, multiple squarish or square solar cells 15, would be arranged in a square box cross-section pattern within the focal zone area 16. The placement of the squarish solar cells 15, in the square box-form pattern would coincide with the location of the flash boiler pipe 8, in the focal zone area 16, for a maximum total al concentration ratio.

The solar cells 15, in assembled linear arrays are supported by a builtup fiberglass epoxy boxform linear member 17, which adds structural rigidity to the full length of the linear solar concentrator panel 1.

The alternate, all electric solar voltaic conversion arrangement requires that end pivots 18, be fitted onto each end partition 1a, to allow the panel to oscillate as they track the ssun's relative motion during the day.

A lightweight framework 13a, and multiple trunnion brackets will support the all-electric solar panels 1, with the end pivots 18, rotating within the trunnion brackets 19, at each end.

A variation on the all-electric solar cell system consists of placing additional solar cells 15, on the vertical sides of the box form linear member 17, while single solar cells 15, remain at the top and bottom of the boxform section. The boxform section 17, would then have a rectangular cross-section, with the longsides in the vertical direction.

What is claimed is:

1. A four quadrant two dimension linear solar concentration panel formed of three blended geometric cross-section shapes,
    a base parabolic reflector section symmetrical about the vertical centerline,
    with two equal and opposite uniformly concave reflective sections blended into the outer edges of said base parabolic reflector section,
    said four quadrant two dimension linear solar concentrator panel constructed of builtup fiberglass and epoxy resin to form a deep concave elongate stuuctural member,
    said four quadrant two dimension linear solar concentration panel provided with a highly reflective mirror-like surface over the entire deep convex surface area,
    said deep concave elongate structural member is reinforced ed with a bottom longitudinal rib, and multiple exterior stringers,
    said deep concave elongate structural member is reinforced with multiple equally spaced cross partitions,
    a flash boiler pipe centrally disposed within said four quadrant two dimension solar concentrator panel at right angle contact with each of said multiple equally spaced cross partitions,
    multiple wire form loops retaining said flash boiler pipe onto each of said multiple equally spaced cross partitions,
    fastening means for said wire form loops onto said multiple equally spaced cross partitions,
    multiple linear convex lens sections supported by said multiple equally spaced cross partitions by means of multiple shaped base pieces,
    said multiple linear convex lens sections disposed centrally above said flash boiler pipe,
    lower oscillating links secured to the ends of said four quadrant two dimension linear solar concentration panels.

2. A four quadrant two dimension linear solar concentration panel according to claim 1, in which the panel width to flash boiler pipe diameter ratio is approximately 18:1,
    the solar concentration ratio is between 22:1 and 27:1,
    the panel width to height cross-section ratio is approximately 2.5:1,
    the base focal distance at the panel centerline to the panel height ratio is 1:2.5,
    the linear convex lens width to flash boiler pipe diameter ratio does not exceed 4:1.

3. A four quadrant two dimension linear solar concentration panel according to claim , wherein the converging solar rays from said base parabolic reflector section are focused on the underside width of said flash boiler pipe,
    the converging solar rays from said two equal and opposite uniformly concave reflective sections are focused on both side heights of said flash boiler pipe,
    the converging solar rays from said multiple linear convex lens sections are uniformly focused on the top width of said flash boiler pipe,
    said flash boiler pipe is axially disposed at the focal zone of three reflective sections and one linear lens section of said four quadrant two dimension linear solar concentration panel.

4. A four quadrant two dimension linear solar concentration panel according to claim 1, in which the concentration ratio of the converging solar rays from said base parabolic reflector section may be pre-balanced in proportion to the converging solar rays from other adjacent reflective sections, the concentration ratio of the converging solar rays from said two equal and opposite uniformly concave reflective sections may be pre-balanced in proportion to the converging solar rays from other reflective sections, the concentration ratio of the converging solar rays from said multiple linear convex lens sections may be pre-balanced in proportion to the converging solar rays from the three reflective sections.

5. A four quadrant two dimension linear solar concentration panel according to claim 1, in which said highly reflective mirror like surface may be made up of multiple narrow mirror segments uniformly bonded onto said deep concave elongate structural member, said highly reflective mirror like surfaces may be comprised of relatively thick continuous reflective metallic foil, said highly reflective mirror like surface made up of multiple narrow mirror segments are lined up in uniform right angle rows and columns within said deep concave elongate structural member.

6. A four quadrant two dimension linear solar concentration panel formed of three blended geometric cross-sections, a base parabolic reflective section symmetrical about the vertical centerline blended with two equal lateral and opposite uniformly concave reflective elongate sections, said four quadrant two dimension linear solar concentration panel constructed of build-up fiberglass and epoxy resin to form a symmetrical deep concave elongate structural member, said four quadrant two dimension linear solar concentrator panel fitted with a highly reflective mirror surface over the full deep concave surface in continuous sections, said deep concave elongate structural members reenforced with a bottom longitudinal rib and multiple external longitudinal side stringers, said deep concave elongate structural members reinforced with multiple equally spaced thin cross partitions, four elongate rows of solar photovoltaic cells uniformly disposed in a square form cross-section pattern within the focal zone of said four quadrant two dimension linear solar conccentration panel, said four elongate rows of solar photovoltaic cells extend the full length of said four quadrant two dimension linear solar concentration panel, elongate linear box-form support means for said four rows of solar photovoltaic cells secured to each of said multiple equally spaced thin cross partitions, multiple linear convex lenses supported by said multiple equally spaced thin cross partitions by means of multiple identical shaped base pieces, each of said multiple linear convex lenses disposed between between two of said multiple equally spaced thin cross partitions, lower oscillating links secured to the ends of said four quadrant two dimension linear solar concentration panel.

7. A four quadrant two dimension linear solar concentration panel according to claim 6, in which the panel width to solar photovoltaic cell width ration is about 16:1, a solar concentration ratio of between 15:1 and 25:1, a panel width to height cross-section ratio of 2.5:1, the base focal distance to panel height ratio is 1:2.5, the solar photovoltaic cell height to width ratio may be as high as 4:1 in a non-square cross-section pattern.

8. A four quadrant two dimension linear solar concentration panel according to claim 6, wherein the converging solar rays from said base parabolic reflective section are focused on the underside elongate row of solar photovoltaic cells, the converging solar rays from said two equal lateral and opposite uniformly concave reflective elongate sections, are focused on both side rows of said solar photovoltaic cells, the converging solar rays from said multiple linear convex lenses are focused on the top row of said solar photovoltaic cells, said four elongate rows of solar photovoltaic cells disposed at the focal zone of the three reflective sections and one linear lens series of said four quadrant two dimension solar concentration panel.

9. A four quadrant two dimension linear solar concentration panel according to claim 6, in which the said four elongate rows of solar cells are of the bi-metal thermoelectric conversion type, a water tubing cooling means is axially disposed through the center of said square form cross-section pattern, the solar thermoelectric cell height to width ratio may be as high as 4:1 in a rectangular cross-section pattern with the long sides vertically disposed.

10. A four-quadrant two dimension linear solar concentrator panel according to claim 6, in which the concentration ratio of the converging solar rays from said base parabolic reflective section may be pre-balanced in proportion to the converging solar rays from adjacent reflective sections, the concentration ratio of the converging solar rays from said two equal lateral and opposite uniformly concave reflective elongate sections may be pre-balanced in proportion to the converging solar rays from adjacent reflective sections, the concentration ratio of the converging solar rays from said multiple linear convex lenses may be pre-balanced in proportion to the converging solar rays from the three reflective sections, said highly reflective mirror surfaces are made up of narrow mirror segments uniformly bonded onto said deep concave elongate structural member, the narrow mirror segmants are lined up in uniform right angle rows and columns within the solar concentrator panel.

* * * * *